Figures 1A, 1B:
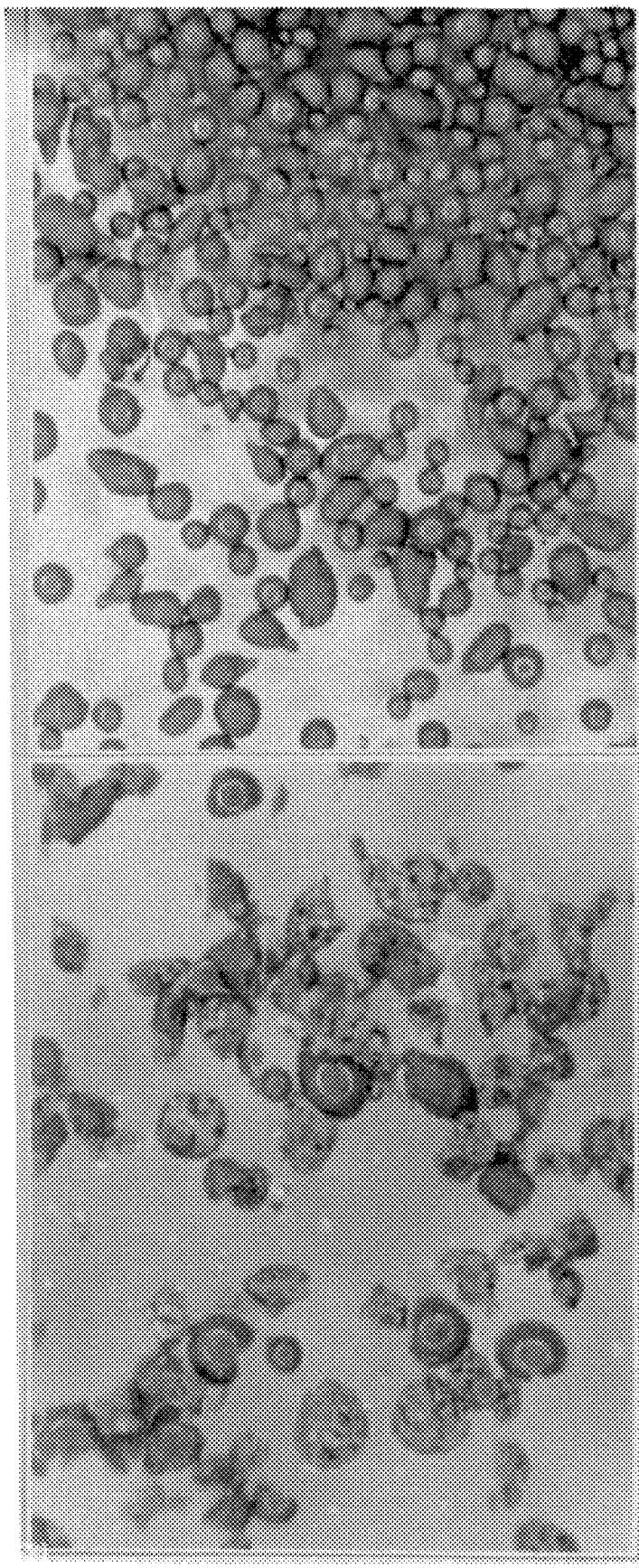

United States Patent
Ballard et al.

[11] Patent Number: 5,900,146
[45] Date of Patent: May 4, 1999

[54] POLYMER BEADS AND METHOD FOR PREPARATION THEREOF

[75] Inventors: Mathew John Ballard, Mt Waverley; Robert James Eldridge, Glen Waverley; James Sydney Bates, Surrey Hills, all of Australia

[73] Assignee: ICI Australia Operations Proprietary Limited, Melbourne, Australia

[21] Appl. No.: 08/809,043

[22] PCT Filed: Sep. 8, 1995

[86] PCT No.: PCT/AU95/00582

§ 371 Date: May 21, 1997

§ 102(e) Date: May 21, 1997

[87] PCT Pub. No.: WO96/07675

PCT Pub. Date: Mar. 14, 1996

[30] Foreign Application Priority Data

Sep. 9, 1994 [AU] Australia .................. PM8070

[51] Int. Cl.$^6$ .................. B01D 35/06; B01J 13/02
[52] U.S. Cl. .................. 210/222; 210/502; 210/504; 210/506; 210/510.1; 252/62.54; 252/62.56; 252/62.51 C; 427/213.31; 427/213.34; 428/361; 428/900; 524/457; 524/459
[58] Field of Search .................. 210/222, 502.1, 210/504, 506, 510.1; 252/62.53, 62.51 R, 62.54, 62.51 C, 62.55, 62.56, 62.57, 62.58, 62.59; 427/212, 213.33, 213.34, 213.36; 428/361, 900; 524/457, 459, 923; 436/526

[56] References Cited

FOREIGN PATENT DOCUMENTS

| 20648 | 10/1969 | Australia . |
|---|---|---|
| 22191/71 | 8/1978 | Australia . |
| 78170/81 | 6/1982 | Australia . |
| 69618/81 | 4/1984 | Australia . |
| 2 099 000 | 12/1982 | United Kingdom . |
| WO80/02687 | 12/1980 | WIPO . |

*Primary Examiner*—David A. Reifsnyder
*Attorney, Agent, or Firm*—Pillsbury Madison & Sutro LLP

[57] ABSTRACT

The present invention relates to a process for producing polymer beads incorporating solid particles and to the novel polymer beads per se. The invention provides a process for producing polymer beads incorporating solid particulate material, which process comprises producing a dispersion having a dispersed phase including one or more monomers also including solid particulate material, and causing said one or more monomers to undergo a polymerization reaction to form said polymer beads, wherein said dispersion further includes a solid phase dispersing agent for dispersing solid particles of material in the dispersed phase and wherein said solid phase dispersing agent reacts with at least one monomer to thereby become chemically incorporated in said polymer. The polymer beads comprise a polymer matrix having solid particulate material dispersed substantially uniformly therein and wherein the polymer matrix incorporates a solid phase dispersing agent chemically reacted into the polymeric matrix.

35 Claims, 5 Drawing Sheets

FIG 2B
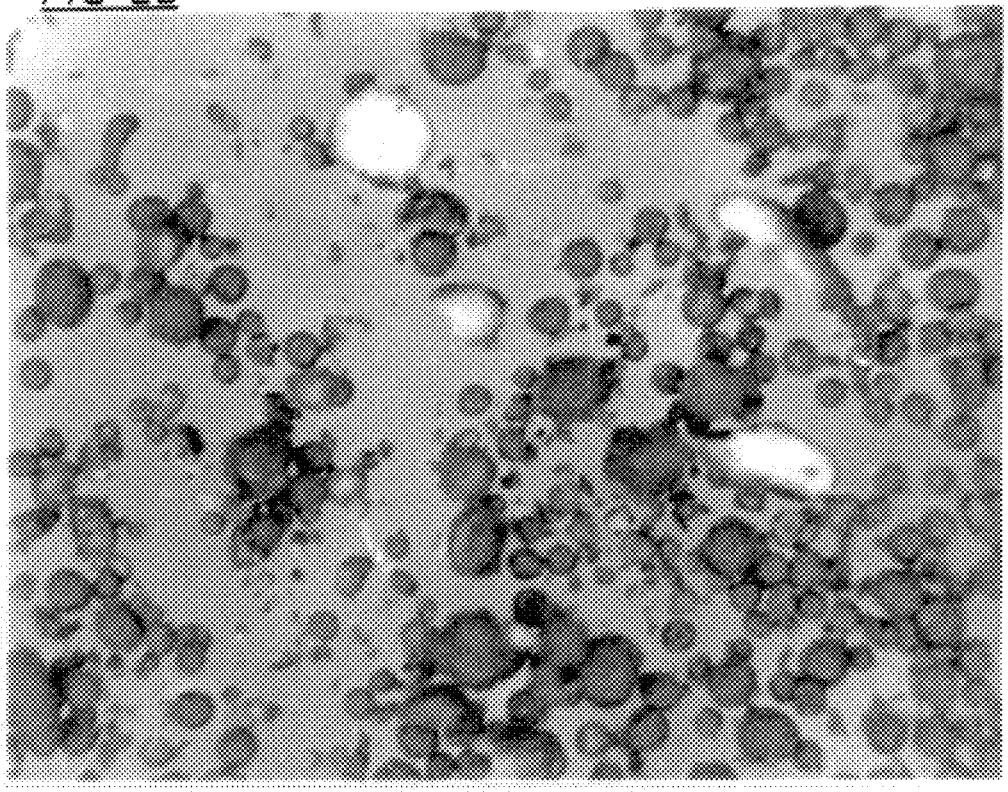
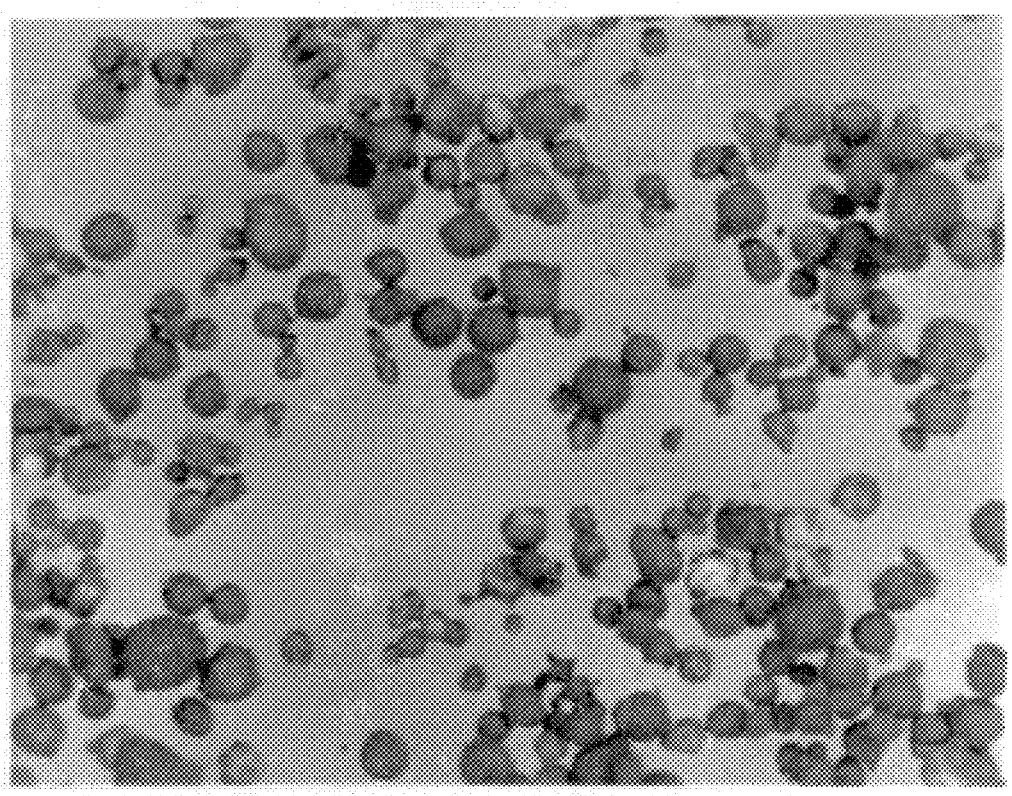
FIG 2A

POLYMER BEADS AND METHOD FOR PREPARATION THEREOF

This application is the national phase of International application PCT/AU95/00582 filed Sep, 8, 1995 which designated the U.S.

The present invention relates to a process for producing polymer beads incorporating solid particles. The polymer beads produced by the process of the present invention are particularly suitable for use as ion exchange resins. The invention further relates to the polymeric beads and to ion exchange resins incorporating the polymeric beads.

Ion exchange is widely used a technique for removing contaminants from water. Ion exchange techniques involve passing water through a packed bed or column of ion exchange resin. Contaminant materials are adsorbed onto the ion exchange resin. Ion exchange resins are particularly suitable for removing contaminants from water.

Crosslinked polymer beads that are physically like ion exchange resins but without the ion-exchanging functional groups are also capable of adsorbing organic contaminants from water; one such resin used for this purpose is XAD resin. Some of the contaminant removal capacity of ion exchange resins observed in practice may be due to adsorption by the polymeric matrix of the resin.

For ease of handling in use, the above crosslinked polymer beads with or without ion exchange functionality should be substantially spheroidal or ellipsoidal in form, ideally they should be substantially uniform in size and free of very small particles. This enhances the flow properties of the dry resin or a concentrated suspension in water so that the resin can be metered or pumped. Such beads can be made by polymerisation of a dispersed monomer phase.

In addition, resin containing dispersed particulate material may enhance the case of separation either by increasing the density of the resin bead or by providing another property such as magnetic susceptibility which can be used to separate the resin from the water. Resins incorporating magnetic particles flocculat and settle rapidly by magnetic attraction. Such particulate material should be incorporated into the resin bead in a manner that prevents its loss by erosion or dissolution during use. It is highly desirable that the particulate material should be dispersed evenly throughout the polymer bead. Improved mechanical strength is a further benefit of even particulate dispersion. This had been difficult to achieve until now.

Processes for the manufacture of magnetic ion exchange resins have been described in some prior art patents. For example, U.S. Pat. No. 2,642,514 assigned to American Cyanamid Company, discloses an ion exchange process using a mixed ion exchange resin. One of the ion exchange resins is a magnetic resin. The magnetic resin is produced by polymerising a reagent mix until a viscous syrup is obtained. Magnetite is added to the viscous syrup and the mixture is agitated to mix in the magnetite. The mixture is cured to form a hard resin that is subsequently ground to form irregular particles of magnetic resin.

European Patent Application No. 0,522,856 in the name of Bradtech Limited also discloses the manufacture of magnetic ion exchange resins by grinding or crushing a polymer having magnetite dispersed throughout the polymer matrix. The processes for producing magnetic ion exchange resins disclosed in U.S. Pat. No. 2,642,514 and EP 0,522,856 require a grinding step, which increases the cost and complexity of the process and increases losses due to the formation of polymer particles outside the desired particle size range during the grinding step.

An alternative process for producing magnetic ion exchange resins is described in Australian Patent Application No. 60530/80 in the name of ICI Australia Ltd. In this process, magnetic porous crosslinked copolymer particles are produced by a dispersion polymerisation process. A mixture of polymerizable vinyl compounds, magnetic powder, polymerisation initiator and suspension stabilizer is dispersed in water and polymerised.

A similar process for producing magnetic ion exchange resins is described in Japanese Patent Application No. 62141071 in the name of Mitsubishi Chemical Industries K.K. In this process it is preferred to add an electron donor substance such as polyvinyl pyridine-styrene copolymer, polyacrylamide-styrene copolymer or polyvinyl imidazole copolymer to the mixture in order to stabilise the dispersion of magnetic powder. According to the patent, the dispersion treatment is important for stabilising the dispersed state so that the rate of settling of the magnetic powder is reduced by breaking up magnetic particles which have clumped together in secondary or larger particles into primary particles. Furthermore, it is necessary to use dispersion equipment which differs from normal mixing equipment, with special mixers being required.

The suspension stabiliser described in the ICI Australia Ltd. patent application and in the Mitsubishi Chemical Industries K.K. patent application are not capable of reacting with the monomers used to form the resins and do not become chemically incorporated into the resin.

Experiments by the present inventors using the process described in JP 62-141,071 showed that use of a polyvinyl pyridine-styrene copolymer, when used as a dispersing that use of a polyvinyl pyridine-styrene copolymer, when used as a dispersing agent in a system containing 10.8% $\gamma$-$Fe_2O_3$ in a glycidyl methacrylate/divinyl benzene copolymer system, gave resin beads that encapsulated the magnetic oxide. However, the beads were irregular in shape, very polydisperse in size, poor in mechanical strength, had a relatively low loading of magnetic oxide which was poorly dispersed in the beads.

It is an object of the present invention to provide an improved process for manufacturing polymer beads incorporating solid particles.

FIGS. 1A, 1B, 2A, 2B, 3A, 3B and 3C are all photomicrographs of polymer beads incorporating solid particles.

In a first aspect, the present invention provides a process for producing polymer beads incorporating solid particulate material, which process comprises producing a dispersion having a dispersed phase including one or more monomers also including solid particulate material, and causing said one or more monomers to undergo a polymerisation reaction to form said polymer beads, wherein said dispersion further includes a solid phase dispersing agent for dispersing solid particles of material in the dispersed phase and wherein said solid phase dispersing agent reacts with at least one monomer to thereby become chemically incorporated in said polymer.

The present invention provides a process which can produce polymer beads in which solid particulate material is evenly distributed throughout the polymer beads.

In a preferred embodiment of the present invention, an organic phase is the dispersed phase and, for convenience, the invention will hereinafter be described with reference to the organic phase being the dispersed phase. However, it will be appreciated that the invention also encompasses an aqueous phase being the dispersed phase, in which case water soluble monomers are used to produce the polymer beads.

Where an organic phase constitutes the dispersed phase, an oil-in-water dispersion is produced. The organic phase includes one or more monomers that react to form the polymer matrix of the polymer beads. It is especially preferred that the polymer matrix be a copolymer, which requires two (or more) monomers to be used. The polymer beads may have ion exchange properties and it is particularly preferred that the process provides for the production of ion exchange resins. Generally ion exchange resins require two types of monomers:

(a) monomers which are able to provide crosslink points; and (b) monomers which are able to provide functional groups.

Of course, the polymer chain may be a copolymer and the functional groups may be added by later reaction of one of the polymer monomer residues in the polymer resin. Accordingly, when the polymer beads are to be used as an ion-exchange resin, the organic phase should include a crosslinking monomer and a functional monomer that provides the necessary functional groups to give the polymer an ion-exchange capability or provides sites that may be later reacted to provide the required functional groups to confer ion-exchange capability to the polyer. Other monomers may be able to be included in the organic phase to copolymerise with the crosslinking monomer and the functional monomer, for example, a backbone monomer may be included.

The cross-linking monomer may be selected from a wide range of monomers, including divinyl monomers such as divinyl benezene, ethyleneglycol dimethacrylate or poly (ethyleneglycol) dimethacrylate or methylene bisacrylamide, ethyleneglycol divinylether and polyvinyl ester compounds having two or more double bonds. This list is not exhaustive.

A wide range of functional monomers may also be used in the process of the present invention. Suitable monomers include glycidyl methacrylate, vinyl benzyl chloride, dimethylaminoethyl methacrylate, N,N-dimethylaminopropyl acrylamide and methacrylamide, vinyl pyridine, diallylamine, and their quaternized derivatives. N-vinyl formamide and its hydrolized derivative, and methyl acrylate and its derivatives. This list is not exhaustive.

The backbone monomers include any monomer polymerizable by free radicals such as styrene, vinyl toluene, methylmethacrylate and other acylates and methacrylates. This list is not exhaustive.

In order to increase the efficieny of removal of contaminants from water being treated by the polymer beads, it is preferred that the polymer beads are macroporous. This increases the total surface are of each bead available for contact. To produce macroporous polymer beads according to the present invention, the dispersed phase should include one or more porogens. The porogen becomes dispersed throughout the droplets that form the dispersed phase, but that porogen does not take part in the polymerisation reaction. Accordingly, after the polymerisation reaction is completed, the porogen can be removed from the polymer beads, for example by washing or steam stripping, to produce macroporosity in the polymer beads.

Suitable porogens for use in the process of the present invention in which the organic phase is the dispersed phase include aromatic compounds such as toluene and benzene, alcohols such as butanol, iso-octanol, cyclohexanol, dodecanol, isoamyl alcohol and methyl iso-butyl carbinol, esters such as ethyl acetate and butyl acetate, saturated hydrocarbons such as n-heptane, iso-octane, halogenated solvents such as dichloroethane and trichloroethylene, plasticisers such as dioctylphthalate and dibutyl adipate, polymers such as polystyrene and polyvinyl acetate; and mixtures thereof. Mixtures of cyclohexanol with other porogens such as dodecanol or toluene have been found to be especially suitable for use as a porogen in the process of the present invention. It will be appreciated that the above list of porogens is not exhaustive and that the invention encompasses the use of other porogens and other combinations of porogens.

In one embodiment, incorporation of the solid particulate material into the polymer beads preferably results in the beads having a higher density than they otherwise would have if the solid particulate material was not present. As the polymer beads have increased density, settling time of the beads is decreased which allows for simpler separation of the beads from a water sample being treated. The solid particulate material may be described as a weighing agent and assist in promoting rapid settling of the polymer beads.

In one embodiment, the solid particulate material used in the present invention may be of any material that has a density higher than the density of the polymer material in the absence of the solids. The solid particulate material is preferably not soluble in water or in any solution or liquid to be treated by contact with the polymer beads. It is also preferred that the solid particulate material does not react with solution or liquid to be treated.

Some examples of suitable solid particulate material include titania, zirconia, barite, cassiterite, silica, aluminosilicates, nickel oxide, copper oxide, zinc oxide, zinc sulphide, and other oxides, sulphides, sulphates and carbonates of heavy metals.

In an especially preferred embodiment, the solid particulate material is a magnetic material. Incorporation of a solid particulate magnetic material into the polymer beads results in the beads becoming magnetic. Magnetic separation techniques may be used to conveniently separate the beads from a solution or liquid being treated. The solid particulate magnetic material used in this embodiment of the present invention may also be any solid material that is magnetic. Examples include $\gamma$-iron oxide ($\gamma$-$Fe_2O_3$, also known as maghemite), magnetite ($Fe_3O_4$), chromium dioxide, other metal oxides and more exotic magnetic materials, such as those based on niobium and other rare earth materials. Maghemite is especially preferred because it is inexpensive.

The solid particulate material is added in the form of particles. The particle size of the particles may range up to a size that is up to one-tenth of the particle size of the polymer beads formed in the process of the present invention. Particles that are larger than that may be difficult to evenly disperse into the polymer beads. More preferably, the particles of solid material range in size from sub-micron (e.g. 0.1 $\mu$m) to 500 $\mu$m, most preferably from 0.1 $\mu$m to 10 $\mu$m.

The process of the present invention includes a solid phase dispersing agent in the dispersed phase. The solid phase dispersing agent acts to disperse the solid material in the droplets of the dispersed phase to thereby form a stable dispersion (or suspension) of the solid particles in the dispersed phase and the solid phase dispersing agent reacts with one or more of the monomers to become chemically reacted into the polymer matrix. Both of these actions are necessary for the effective dispersal of the solid particulate material in the polymer beads. Use of a suitable solid phase dispersing agent results in polymer beads being formed in which the solid particulate material is evenly dispersed throughout the polymer bead and the solid phase dispersing agent is chemically reacted with the polymer matrix. This avoids, or at least alleviates, the problem of leaching of the solid particulate material from the polymer beads. This avoids, or at least alleviates, the problem of erosion of the solid particulate material from the polymer beads in service, as may happen if the solid material was located only on the outer surface of the beads. Selection of the solid phase dispersion agent will depend upon the particular solid material being used and the monomers being used. The solid phase dispersing agent should have a good affinity for the surface of the solid material and be able to react with one or more of the monomers.

As one example, a silane methacrylate is a suitable solid phase dispersing agent for use with titania or zirconia particles.

Persons skilled in the art should be readily able to select a desired solid phase dispersing agent for the specific reaction system employed.

The polymerisation reaction taking place in the process of the present invention is a suspension polymerisation reaction and techniques known to those skilled in the art to control and monitor such suspension polymerisation reactions apply to the present invention. In order to maintain the dispersed phase in the form of a suspension of droplets in the continuous phase whilst avoiding aggregation of the droplets, a stabilising agent is preferably used. Where the dispersed phase is the organic phase, the stabilising agent may be polyvinyl alcohol, gelatine, methyl cellulose or sodium polyacrylate. It is to be understood that the invention extends to cover any stabilising agent that may be suitable for use. The stabilising agent is typically present in an amount of 0.01 to 5.0% by weight, and preferably 0.05 to 2.0% by weight, based on the weight of the whole mixture.

It will also be generally necessary to use an initiator to initiate the polymerisation reaction. The initiator to be used depends upon the monomers present in the reaction mixture and the choice of initiator and the amount required will be readily apparent to the skilled addressee. By way of example only, suitable initiators include azoisobutyronitrile, benzoyl peroxide, lauroyl peroxide and t-butyl hydroperoxide. The amount of initiator used is generally in the range of 0.01 to 5.0 wt %, more preferably 0.10 to 1.0%, calculated on the total weight of monomer(s).

In a preferred embodiment of the present invention, the monomer mixture may include a functional monomer present in an amount of from 10 to 99% by weight, based upon the weight of total monomers, more preferably 50 to 90% by weight (same basis). The crosslinking monomers may be present in an amount of from 1 to 90% by weight, based on the weight of total monomers, more preferably 10 to 50% by weight (same basis). Additional monomers may be present in an amount of 0 to 60% by weight, more preferably 0 to 30% by weight, based on the weight of total monomers. The total monomers may constitute from 1.0 to 50%, more preferably 5.0 to 30% by weight of the whole suspension polymerisation mixture.

The solid particles of material are preferably added in an amount of from 10 to 300 wt %, based on the weight of total monomers, more preferably 20 to 100% by weight (same basis). The solid phase dispersing agent is preferably added in an amount of 0.10 to 30.0% by weight, more preferably 1.0 to 10.0% by weight, based on the weight of solid particles of material.

The dispersion of the dispersed phase (which includes the monomer(s)) in the continuous phase is usually achieved by mixing the organic and aqueous phases and shearing the resulting mixture. The shear applied to the dispersion can be adjusted to control the size of the droplets of the dispersed phase. As the droplets of dispersed phase are polymerised to produce the polymer beads, the shear applied to the dispersion largely controls the particle size of the polymer beads. Generally, the polymer beads are controlled to have a particle size in the range of 10–5000 $\mu$m.

Once a stable dispersion of dispersed phase in continuous phase is established, the polymerisation reaction is started by heating the dispersion to the desired reaction temperature. The dispersion may be held at the desired reaction temperature until the polymerisation reaction is substantially complete.

Once the polymerisation reaction is substantially complete, the polymer beads may be optionally treated to activate the active sites in the polymer for ion exchange and the beads recovered. The activation of the active sites in the polymer for ion-exchange will be dependent on the nature of the species to be separated from solution. For example, hydrolysis of poly(ethyl acrylate) beads will provide a weak acid cation ion exchange resin suitable for separating transition metal ions such as cadmium and zinc from solution. Amination or quaternization of the polymer beads may be used to provide an ion exchange resin suitable for the removal of acidic organic materials from solution. It will be clear to those skilled in the art that the means for activation of the ion exchange sites may be conveniently selected dependent on the nature of the compounds to be separated from solution. The beads may require cleaning before use. This may be achieved by a sequence of washing the beads or by steam stripping the beads.

One method for cleaning the polymer beads includes the following steps:

(a) add reaction to a large excess of water, stir and allow to settle;

(b) separate beads from the supernatant;

(c) add seperated beads to a large excess of water, stir and allow to settle before separating beads from the supernatant;

(d) repeat step (c) several times; (e) disperse water washed beads in alcohol (ethanol); (f) separate beads from alcohol and dry.

An alternative clean-up procedure is to steam strip the porogens and then wash the polymer beads to remove any free solid particulate material.

The present invention provides a process which produces polymer beads in which solid particulate material is evenly distributed throughout the polymer beads. In an especially preferred embodiment of the invention, a magnetic polymer bead is produced. The polymer is formed as a copolymer of glycidyl methacrylate and divinyl benzene. The monomers are present in the organic phase, which also includes a mixture of cyclohexanol with toluene or dodecanol as porogens. Polyvinyl alcohol is used as a stabilising agent. A free radical initiator such as "VAZO" 67 or Azoisobutyronitrile (AIBN) is added to the organic phase as a polymerisation initiator and $\gamma$-iron oxide is the magnetic material. The solid phase dispersing agent preferred for use in this system is a block copolymer of poly(hydroxystearic acid) and poly (ethyleneimine) and sold under the trade name SOLSPERSE 24000. This solid phase dispersing agent has a high affinity for the surface of the $\gamma$-iron oxide and also reacts with the epoxy group of the glycidyl methacrylate through its primary and secondary amino groups and then the vinyl groups from the methacrylate react with polymersing radicals to become covalently bound to the polymer matrix. All of the components of the organic phase are preferably pre-mixed in a separate tank and dispersed in water in the reaction tank.

In another aspect, the present invention provides a process which produces polymer beads which incorporates a toughening agent. The toughening agents are selected to increase the impact resistance of the polymer. The general techniques for increasing the toughness of polymer beads prepared in accordance with the present invention may readily be employed to produce bead with increased durability. For example, rubber toughening agents may be used in improve the strength and durability of styrene-based polyer beads. The use of these rubber toughening agents not only results in improved durability but increases the serviceable life of the polymer beads. The rubber toughening agents include low molecular weight rubbers which may be incorporated into the dispersed phase. A particularly preferred rubber toughening agent is sold under the trade designation Kraton D1102 although other commercially available rubber toughening agents are available.

In another aspect, the present invention provides polymer beads comprising a polymer matrix having solid particulate material dispersed substantially uniformly therein and wherein the polymer matrix incorporates a solid phase dispersing agent chemically reacted into the polymeric matrix.

The polymer beads are preferably macroporous. The particle size of the polymer beads is preferably within the range of 30 μm to 100 μm. The particles of solid material may have a particle size in the range of sub-micron (e.g. 0.1 μm) to 500 μm and more preferably from 0.1 μm to 10 μm.

The solid particulate material may act to increase the density, and hence the weight of the polymer beads. Examples of solid particulate materials suitable for use in the present invention include titania and zirconia.

In an especially preferred embodiment, the solid particulate material is of a magnetic material and accordingly the polymer beads will be magnetic.

The solid phase dispersing agent is a chemical compound or species that can react with the monomers used to produce the polymeric matrix such that the solid phase dispersing agent is incorporated into the polymeric matrix. Further, the solid phase dispersing agent should have a good affinity for the surface of the solid particles and preferably should be able to chemically bond to the surface of the solid particles. The use of such agent allows the solid particles to be dispersed throughout the polymeric matrix.

As the solid particles are dispersed throughout the polymer beads of the present invention, the solid particles are not easily removed from the beads and this allows the beads to be subjected to a number of handing operations, such as conveying, pumping and mixing, without substantially erosion of solid particles therefrom.

In another aspect, the present invention provides polymer beads comprising a polymeric matrix having solid particulate material dispersed therein, wherein the polymeric matrix incorporates a solid phase dispersing agent which is chemically reacted into the polymer matrix and wherein the polymer beads incorporate a toughening agent.

The invention further provides ion exchange resins including polymeric beads in accordance with the present invention.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

The invention will be further described with reference to the following non-limiting Examples.

EXAMPLE 1

Magnetic polymer beads were prepared in accordance with the process of the present invention using the following raw materials:

1. Water: This is the continuous medium in which the organic phase is dispersed and then reacted.
2. Gosenhol® GH 17: this is a high molecular weight polymeric surfactant, a polyvinyl alcohol, that disperses the organic phase in the water as droplets.
3. Teric® N9: this is a low molecular weight surfactant that is added to further reduce the particle size of the dispersed organic phase.
4. Cyclohexanol: this is the major porogen: it is a solvent for the monomers, but a non-solvent for the polymer, and it promotes the formation of voids and internal porosity in the resin beads.
5. Deodecanol: this is the minor porogen.
6. Solsperse® 24000: it is a solid phase dispersing agent and is a block copolymer of poly(hydroxystearic acid) and poly(ethyleneimine).
7. Pferrox® 2228HC γ-$Fe_2O_3$: gamma—iron oxide (maghemite). This is the magnetic oxide that makes the resin beads magnetic.
8. DVB-50 (divinyl benzene): this is the monomer that crosslinks the beads.
9. GMA (glycidyl methacrylate): this is the monomer that is first polymerised to incorporate it into the beads, then it is quaternized to place quaternary ammonium groups into the beads, thereby creating the ion exchange sites:

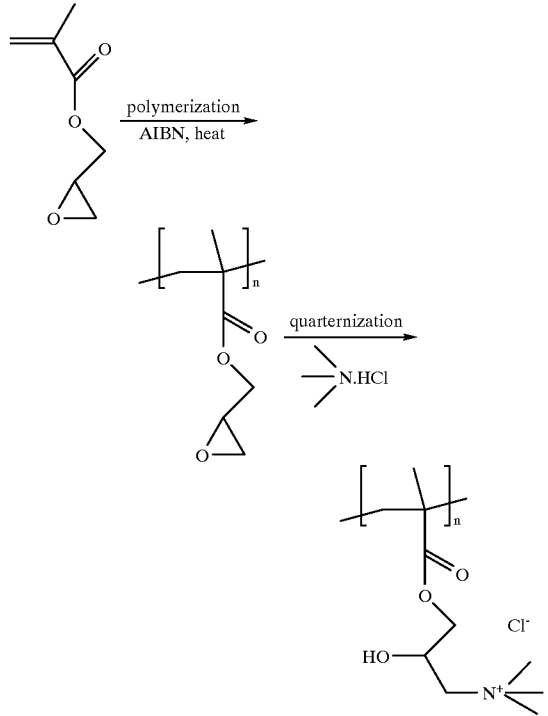

10. AIBN: this is the catalyst that initiates polymerisation when the mixture is heated above 50° C.
11. Trimethylamine: this is the amine that reacts with the epoxy group of the glycidyl methacrylate to form quaternary ammonium ion exchange sites.
12. Hydrochloric acid: this is used to neutralise the high pH due to the trimethylamine.
13. Ethanol: this is used as a rinse and as a wetting agent.

Method

Water (6.3 L) was charged to a 20 L reactor and the stirrer and nitrogen purge started. Next Gosenhol® GH-17 (30 g)

and Teric® N9 (15 g) were added, and the water phase heated to 80° C. to dissolve the surfactants. While the water was heating cyclohexanol (1755 g) was charged to a separate stirred mix tank and the stirrer turned on. Dodencanol (195 g), SOLSPERSE® 24000 (63 g), Pferrox 2228 HC $\gamma$-$Fe_2O_3$ (936 g), divinylbenzene (410 g), and glycidyl methacrylate (1541 g) were added in turn. This mixture was stirred and sonicated for one hour. Azoisobutyronitrile (8 g) was added and the mixture was stirred for a further five minutes before adding it to the heated water phase. The resulting dispersion was held at 80° C. (±5° C.) for two hours, during which time polymerisation occurs and the solid resin beads (2.95 kg) were formed. The nitrogen purge is then stopped and the trimethylamine and the hydrochloric acid are added to aminate the resin. These two materials can either be pre-mixed (with great caution due to the exotherm), or added in such a way as to maintain the pH between 6 and 8. The reaction mixture is then held at 80° C. for three hours. The mixture is then cooled to room temperature, and the beads separated from the excess $\gamma$-$Fe_2O_3$ by repeated cycles of washing, settling and decanting (the beads settle much faster than the free oxide particles). The resin beads are then filtered, redispersed in ethanol, then filtered and washed with additional ethanol, then acetone, and dried with an air stream. Photomicrographs of the polymer beads produced by this example are shown in FIGS. 1A and 1B. As can be seen, especially from FIG. 1B which is a photomicrograph of cracked beads, the solid particles are evenly dispersed throughout the polymer beads.

The maghemite was well dispersed throughout the resin beads produced in this Example.

Comparative Example 1

The materials and method of Example 1 were used to make 58 g of resin on a 300 g scale, the sole difference being that the dispersant for the $\gamma$-$Fe_2O_3$, Solsperse 24000, was omitted from the preparation. After the polymerisation and quaternization, fine, dark brown beads were obtained. However, when the beads were cracked open, their interiors were white and only the surfaces were brown. Photomicrographs of these beads are shown in FIGS. 2A and 2B. FIG. 2B is a photomicrograph of cracked beads and, as can be seen, the $\gamma$-$Fe_2O_3$ was only attached to the surface of the beads and not dispersed through the bulk. This means that the beads are highly likely to lose $\gamma$-$Fe_2O_3$ in service.

EXAMPLE 2

Magnetic macroporous weak acid cation exchanger beads are prepared in accordance with the process of the invention. The suspension polymerization described in Example 1 was repeated with the glycidyl methacrylate replaced by an equal weight of ethyl acrylate. At the end of the polymerization sodium hydroxide was added to the aqueous phase (1.5 moles per mole of ethyl acrylate) and the mixture gently stirred at 80 degrees. Samples were withdrawn at intervals and the beads washed by decantation with water and ethanol as described in Example 1, then packed into a glass column fitted with a porous glass frit and eluted with dilute hydrochloric acid to convert the sodium acrylate functional groups to acrylic acid groups. The beads were then dried in a vacuum oven. The unhydrolyzed poly(ethyl acrylate) beads contained 40.3% iron oxide by weight. After hydrolysis for 2 hours at 80 degrees the product had a weak acid capacity of 2.1 milliequivalents per gram and contained 40.2% iron oxide; after 7 hours' hydrolysis the capacity was 2.9 meq/g and the iron oxide content 38.8%.

EXAMPLE 3

Magnetic polymer beads were prepared in accordance with the process of the present invention using the following raw materials:

1. Water: this is the continuous medium in which the organic phase is dispersed and then reacted.
2. Gosenhol®GH 20: this is a high molecular weight polymeric surfactant, a polyvinyl alcohol, that disperses the organic phase in the water as droplets.
3. Cyclohexanol: this is the major porogen: it is a solvent for the monomers, but a non-solvent for the polymer, and it promotes the formation of voids and internal porosity in the resin beads.
4. Toluene: this is the minor porogen.
5. Solsperse® 24000: it is a solid phase dispersing agent and is a block copolymer of poly(hydroxystearic acid) and poly(ethyleneimine).
6. Pferrox® 2228HC $\gamma$-$Fe_2O_3$: gamma—iron oxide (maghemite). This is the magnetic oxide that makes the resin beads magnetic.
7. KRATON® D1102: this is a low molecular weight rubber, incorporated into the organic phase to toughen the polymer beads.
8. DVB-50 (divinyl benzene): this is the monomer that crosslinks the beads.
9. GMA (glycidyl methacrylate): this is the monomer that is first polymerized to incorporate it into the beads, then it is quaternized to place quaternary ammonium groups into the beads, thereby creating the ion exchange sites.
10. VAZO® 67: this is the catalyst that initiates polymerisation when the mixture is heated above 50° C.
11. Trimethylamine: this is the amine that reacts with the epoxy group of the glycidyl methacrylate to form quaternary ammonium ion exchange sites.
12. Hydrochloric acid: this is used to neutralise the high pH due to the trimethylamine.

Method

Figure 3A:
Figure 3B:
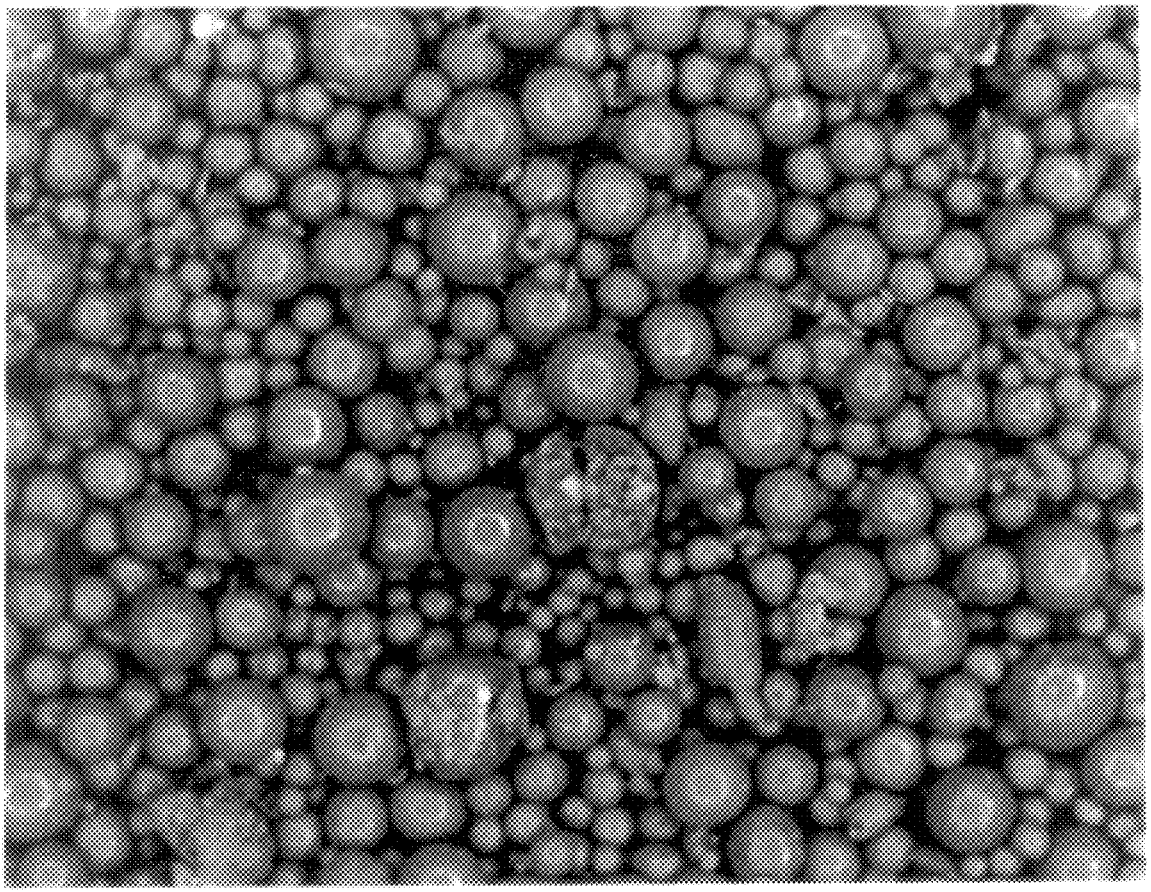
Figure 3C:
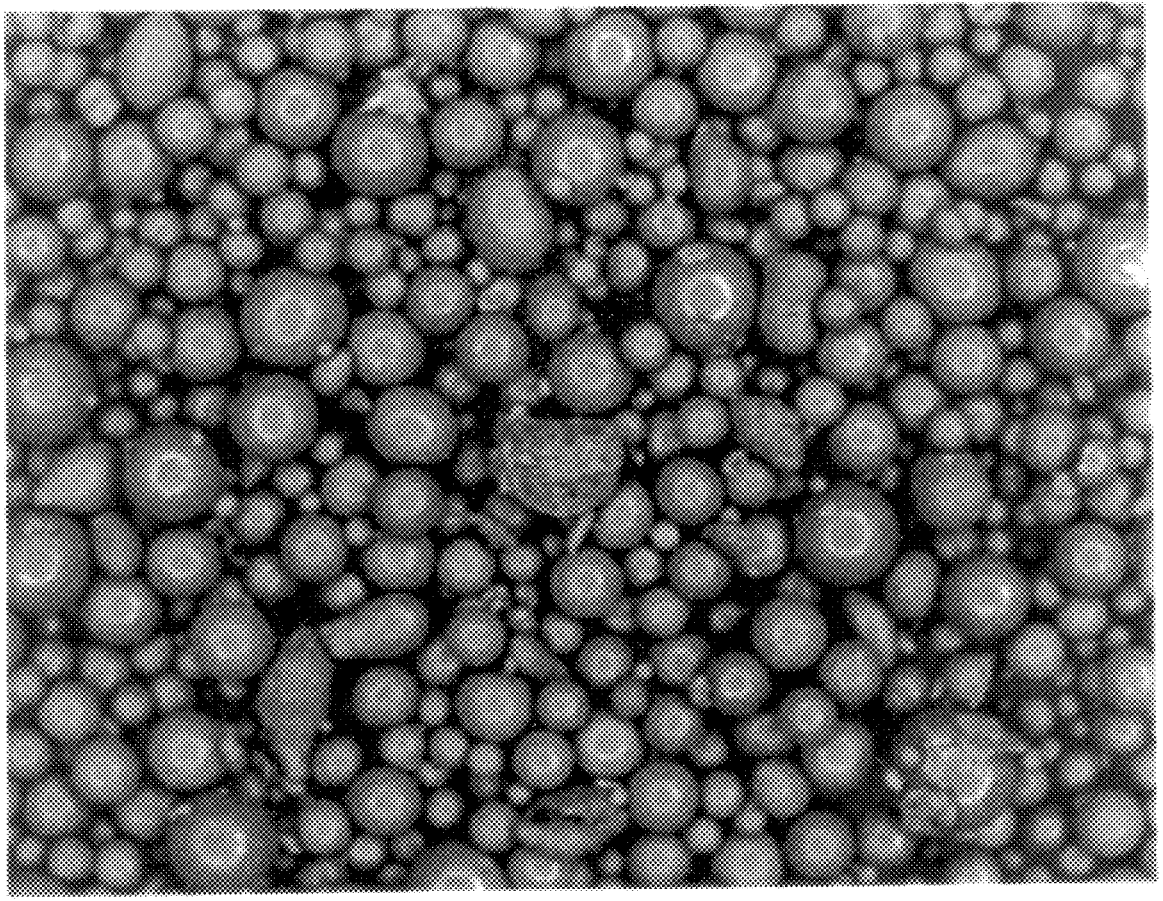

Water (2333 g) was charged to a 5 L reactor and the stirrer and nitrogen purge started (Next, Gosenhol GH20 (10 g) was added, and the water phase heated to 80° C. While the water was heating Toluene (130 g), DVB-50 (130 g) and a first portion of Cyclohexanol (130 g) were charged to a separate mix tank and the stirrer turned on. The Solsperse 24000 (21.84 g) and the Pferrox 2228 HC $\gamma$-$Fe_2O_3$ (325 g) were added in turn, then the mixture was stirred and sonicated for 20 minutes to thoroughly disperse the magnetic oxide. Kraton D1102 was then added and the mixture stirred for a further hour to dissolve the toughening agent. Glycidyl methacrylate (520 g), the remaining Cyclohexanol (390 g) and the VAZO 67 (2.65 g) were then added and the mixture was stirred for a further five minutes before adding it to the heated water phase. The resulting dispersion was then stirred and held at 80° C. for two hours. The nitrogen purge was stopped and a mixture of trimethylamine (687 g; 25% w/w) and hydrochloric acid (294 g; 36% w/w) added, then the mixture was then stirred and held at 80° C. for a further three hours. The mixture was then cooled and the resulting polymer beads cleaned as in Example 1. A photomicrograph of the beads is shown in FIG. 3A. FIGS. 3B and 3C are photomicrographs showing the beads crushed between two microscope slides. Some of the beads are broken revealing their interiors. This illustrates that the solid magnetic oxide is well dispersed throughout the beads, and the beads are qualitatively tougher than those of Example 1. Further, the size distribution of the polymer beads was relatively narrow.

EXAMPLE 4

Magnetic polymer beads were prepared in the manner of Example 3, except that the temperature of polymerisation was 70° C. Polymer beads similar to those of Example 3 were produced.

EXAMPLE 5

Magnetic polymer beads were prepared in the manner of Example 3, except that the temperatures of polymerization was 90° C., and that the mixture of monomers, porogens and magnetic oxide was gradually fed to the water phase over sixty minutes. Polymer beads with excellent magnetic oxide dispersion and strength resulted, however the distribution of polymer beads sizes were relatively broad.

EXAMPLE 6

Magnetic polymer beads were prepared in the manner of Example 3, except that the initiator was Lauroyl Peroxide. The resulting polymer beads were not homogeneous. In some instances the distribution of magnetic oxide was acceptable however there was varying extents of separation of the magnetic oxide from the polymer matix. Some beads contained no magnetic oxide.

EXAMPLE 7

Magnetic polymer beads were prepared in the manner of Example 3, except that the initiator was Benzoyl Peroxide. While the resulting polymer beads had acceptable magnetic oxide distribution, the beads had a vey broad size distribution, and many were irregular, rather than spherical, in shape.

EXAMPLE 8

Magnetic polymer beads were prepared in the manner of Example 3, except that the amount of Solsperse 24000 was one third that in Example 3. The resulting beads had a poor distribution of magnetic oxide, with internal regions that were white due to a lack of oxide, similar to Comparative Example 1. There was much magnetic oxide not incorporated into the beads.

EXAMPLE 9

Magnetic polymer beads were prepared in the mannner of Example 3, except that the amount of Solsperse 24000 was three times that in Example 3. While the resulting polymer beads generally had acceptable magnetic oxide distribution, the beads also frequently included smaller white beads that were free of oxide, and were fragile, rather than tough.

EXAMPLE 10

Magnetic polymer beads were prepared in the manner of Example 3, except that the amount of Gosenhol GH20 was one third that in Example 3. While the resulting polymer beads generally had acceptable magnetic oxide distribution, the beads also frequently included smaller white beads that were free of oxide, but were tough, unlike Example 9.

EXAMPLE 11

Magnetic polymer beads were prepared in the manner of Example 3, except that the amount of Gosenhol GH20 was three times that in Example 3. The resulting polymer beads had good magnetic oxide distribution and were tough. However, the beads occasionally included smaller white beads that were free of oxide, but were hard and tough, unlike Example 9.

It will be appreciated that the invention described herein is susceptible to variations and modifications other than those specifically described. It is to be understood that the invention encompass all such variations and modifications that fall within the spirit and scope.

We claim:

1. A process for producing polymer beads of ion exchange resin incorporating solid particulate material, which process comprises producing a dispersion having a dispersed phase including one or more monomers and the solid particulate material, and causing said one or more monomers to undergo a polymerisation reaction to form said polymer beads of ion exchange resin, wherein said dispersion further includes a solid phase dispersing agent for dispersing the solid particulate material in the dispersed phase and wherein said solid phase dispersing agent reacts with the at least one monomer to thereby become chemical incorporated in said polymer beads of ion exchange resin.

2. A process according to claim 1 wherein the dispersed phase is an organic phase.

3. A process according to claim 1 wherein the ion exchange resins are produced from crosslinking monomers which are able to provide crosslinking points and/or functional monomers which are able to provide ion exchange functional groups.

4. A process according to claim 3 wherein the crosslinking monomers are selected from the group consisting of the divinyl monomers divinyl benzene, ethyleneglycol dimethyacrylate or poly(ethyleneglycol)dimethacrylate or methylene bisacrylamide, ethyleneglycol divinylether and polyvinyl ester compounds having two or more double bonds.

5. A process according to claim 3 wherein the functional monomers are selected from the group consisting of glycidyl methacrylate, vinyl benzyl chloride, dimethylaminoethyl methacryalte, N,N-dimethylaminopropyl acrylamide and methacrylamide, vinyl pyridine, diallylamine, and their quaternized derivatives, N-vinyl formamide and its hydrolized derivatives.

6. A process according to claim 3 wherein said functional monomers are present in a amount of from 10 to 99% by weight based upon the total monomers, said crosslinking monomers being present in an amount of from 1 to 90% by weight based upon the total monomers and additional monomers may be present in a amount of up to 60% by weight based upon the total monomers.

7. A process according to claim 3 wherein said functional monomers are present in an amount of from 50 to 90% by weight based upon the total monomers, said crosslinking monomers being present in an amount of from 10 to 50% by weight based upon the total monomers and additional monomers may be present in an amount of up to 30% by weight based upon the total monomers.

8. A process according to claim 3 wherein total monomers are present in an amount of from 1.0 to 50% by weight of the mixture.

9. A process according to claim 3 wherein total monomers are present in an amount of from 5.0 to 30% by weight of the mixture.

10. A process according to claim 3 wherein the polymer beads of ion exchange resins are treated to activate sites in the polymer beads of ion-exchange resins.

11. A process according to claim 10 wherein the polymer beads of ion exchange resins are treated to by one of hydrolysis, amination and quatrinization.

12. A process according to claim 1 wherein the dispersed phase further includes one or more porogens.

13. A process according to claim 12 wherein said porogens are selected from the group consisting of aromatic compounds toluene and benzene, the alcohols butanol, iso-octanol, cyclohexanol, dodecanol, isoamyl alcohol and methyl iso-butyl carbinol, the esters ethyl acetate and butyl acetate, the saturated hydrocarbons n-heptane, iso-octane, the halogenated solvents dichloroethane and trichloroethylene, and plasticisers dioctylphthalate and dibutyl adipate, the polymers polystyrene and polyvinyl acetate; and mixtures thereof.

14. A process according to claim 12 wherein said porogens are mixtures of cyclohexanol with dodecanol or toluene.

15. A process according to claim 1 wherein said solid particulate material is a weighting agent.

16. A process according to claim 15 wherein said solid particulate material is selected from the group consisting of titania, zirconia, barite, cassiterite, silica, aluminosilicates, nickel oxide, copper oxide, zinc oxide and zinc sulphide.

17. A process according to claim 1 wherein said solid particulate material is a magnetic material.

18. A process according to claim 17 wherein said solid particulate material is selected from the group consisting of γ-iron oxide (γ-$Fe_2O_3$, also known as maghemite), magnetite ($Fe_3O_4$) and chromium dioxide.

19. A process according to claim 1 wherein said solid particulate material ranges in size from sub-micron to 500 μm.

20. A process according to claim 1 wherein said solid particulate material is in the range of from 0.1 μm to 10 μm.

21. A process according to claim 1 wherein said dispersion further includes a stabilizing agent.

22. A process according to claim 21 wherein said stabilizing agent is selected from the group consisting of polyvinyl alcohol, gelatine, methyl cellulose or sodium polyacrylate.

23. A process according to claim 21 wherein said stabilizing agent is present in an amount of 0.01 to 5.0% by weight of the whole dispersion.

24. A process according to claim 21 wherein said stabilizing agent is present in an amount of 0.05 to 2.0% by weight, based on the weight of the whole dispersion.

25. A process according to claim 1 wherein said dispersion further includes an initiator.

26. A process according to claim 25 wherein said initiator is selected from the group consisting of azoisobutyronitrile, benzoyl peroxide, lauroyl peroxide and t-butyl hydroperoxide.

27. A process according to claim 25 wherein said initiator is present in the range of 0.01 to 5.0 wt % based on the total weight of monomers.

28. A process according to claim 25 wherein said initiator is present in the range of 0.1 to 1.0 wt % based on the total weight of monomers.

29. A process according to claim 1 wherein the solid particulate material is present in an amount of from 10 to 30% based upon the weight of the total monomers.

30. A process according to claim 1 wherein the solid particulate material is present in an amount of from 20 to 100% based upon the weight of the total monomers.

31. A process according to claim 1 wherein said solid phase dispersing agent is present in an amount of from 0.10 to 30.0% by weight of the solid particulate material.

32. A process according to claim 1 wherein said solid phase dispersing agent is present in an amount of from 1.0 to 10.0% by weight of the solid particulate material.

33. A process according to claim 32 wherein the polymer beads of ion exchange resins are treated to a subsequent step.

34. A process according to claim 1 wherein all the components of the dispersed phase are premixed and subsequently dispersed in a continuous phase.

35. A process according to claim 1 wherein said dispersed phase further includes a toughening agent.

* * * * *